(12) United States Patent
Tetsuka

(10) Patent No.: US 12,001,059 B2
(45) Date of Patent: Jun. 4, 2024

(54) OPTICAL FIBER COMPONENT, DEMULTIPLEXER, AND OPTICAL TRANSMISSION SYSTEM

(71) Applicant: KYOCERA CORPORATION, Kyoto (JP)

(72) Inventor: Nobuyuki Tetsuka, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 2 days.

(21) Appl. No.: 17/620,114

(22) PCT Filed: Jun. 12, 2020

(86) PCT No.: PCT/JP2020/023125
§ 371 (c)(1),
(2) Date: Dec. 17, 2021

(87) PCT Pub. No.: WO2021/014815
PCT Pub. Date: Jan. 28, 2021

(65) Prior Publication Data
US 2022/0236487 A1    Jul. 28, 2022

(30) Foreign Application Priority Data
Jul. 23, 2019  (JP) .................................. 2019-135601

(51) Int. Cl.
G02B 6/293    (2006.01)
G02B 6/04     (2006.01)
G02B 6/28     (2006.01)
H04B 10/80    (2013.01)

(52) U.S. Cl.
CPC ......... G02B 6/2938 (2013.01); G02B 6/2852 (2013.01); H04B 10/807 (2013.01); G02B 6/04 (2013.01); G02B 6/28 (2013.01)

(58) Field of Classification Search
CPC ...... G02B 6/2938; G02B 6/2852; G02B 6/04; G02B 6/28; H04B 10/80; H04B 10/807
See application file for complete search history.

(56) References Cited

U.S. PATENT DOCUMENTS

| | | |
|---|---|---|
| 5,089,055 A | 2/1992 | Nakamura |
| 9,535,217 B1 | 1/2017 | Farmer et al. |
| 2009/0251770 A1* | 10/2009 | Lewis ................. H01S 3/06754 359/341.3 |
| 2014/0010501 A1 | 1/2014 | Saito et al. |
| 2017/0248759 A1* | 8/2017 | Salokatve .............. G02B 6/255 |
| 2020/0174189 A1* | 6/2020 | Barzegar ................. H04J 14/02 |

FOREIGN PATENT DOCUMENTS

| | | | |
|---|---|---|---|
| CN | 108802899 A | * | 11/2018 |
| JP | S58196504 A | | 11/1983 |
| JP | H04234011 A | | 8/1992 |

(Continued)

*Primary Examiner* — Leslie C Pascal
(74) *Attorney, Agent, or Firm* — HAUPTMAN HAM, LLP

(57) ABSTRACT

An optical fiber component includes a plurality of optical fibers bundled together at one end at least. The plurality of optical fibers includes a first optical fiber centered at the one end and a plurality of second optical fibers disposed around the first optical fiber at the one end. Each of the plurality of second optical fibers has, at the one end, an end face shape including a straight portion and a corner portion.

19 Claims, 3 Drawing Sheets

(56) References Cited

FOREIGN PATENT DOCUMENTS

| | | | |
|---|---|---|---|
| JP | 2001517875 | A | 10/2001 |
| JP | 2009542028 | A | 11/2009 |
| JP | 2010135989 | A | 6/2010 |
| JP | 2013225010 | A | 10/2013 |
| JP | 2015114606 | A | 6/2015 |
| WO | 2007148139 | A1 | 12/2007 |

* cited by examiner

OPTICAL FIBER COMPONENT, DEMULTIPLEXER, AND OPTICAL TRANSMISSION SYSTEM

RELATED APPLICATIONS

The present application is a National Phase of International Application No. PCT/JP2020/023125 filed Jun. 12, 2020, which claims priority to Japanese Application No. 2019-135601, filed Jul. 23, 2019.

TECHNICAL FIELD

The present disclosure relates to an optical fiber component, a demultiplexer and an optical transmission system.

BACKGROUND ART

There is disclosed in Patent Literature 1 an optical multiplexer/demultiplexer that separates (demultiplexes) light of a plurality of wavelengths transmitted through an optical fiber. In the optical multiplexer/demultiplexer of Patent Literature 1, in the middle of an optical path, an optical filter allows light of a first wavelength and light of a second wavelength to pass through and reflects light of a third wavelength, thereby transmitting light of a plurality of wavelengths to a plurality of cores.

CITATION LIST

Patent Literature

Patent Literature 1: JP 2013-225010 A

SUMMARY OF INVENTION

Problem to Solve

In the case where light of a plurality of wavelengths is transmitted through a single optical fiber, it is desired that the light of a plurality of wavelengths can be demultiplexed efficiently at the output end of the optical fiber.

Solution to Problem

An optical fiber component of the present disclosure is an optical fiber component including a plurality of optical fibers bundled together at one end at least, the plurality of optical fibers including:

a first optical fiber centered at the one end; and a plurality of second optical fibers disposed around the first optical fiber at the one end, wherein each of the plurality of second optical fibers has, at the one end, an end face shape including a straight portion and a corner portion.

A demultiplexer of the present disclosure is a demultiplexer including the above optical fiber component, wherein the demultiplexer demultiplexes light of a plurality of wavelengths output from an optical fiber including a core, a first cladding located around the core, and a second cladding located around the first cladding, and wherein the one end of the optical fiber component faces an output end face of the optical fiber.

An optical transmission system of the present disclosure is an optical transmission system including the above demultiplexer, wherein the optical transmission system transmits signal light and feed light through the optical fiber, and wherein the demultiplexer faces the output end face of the optical fiber.

DESCRIPTION OF EMBODIMENTS

Figure 1:
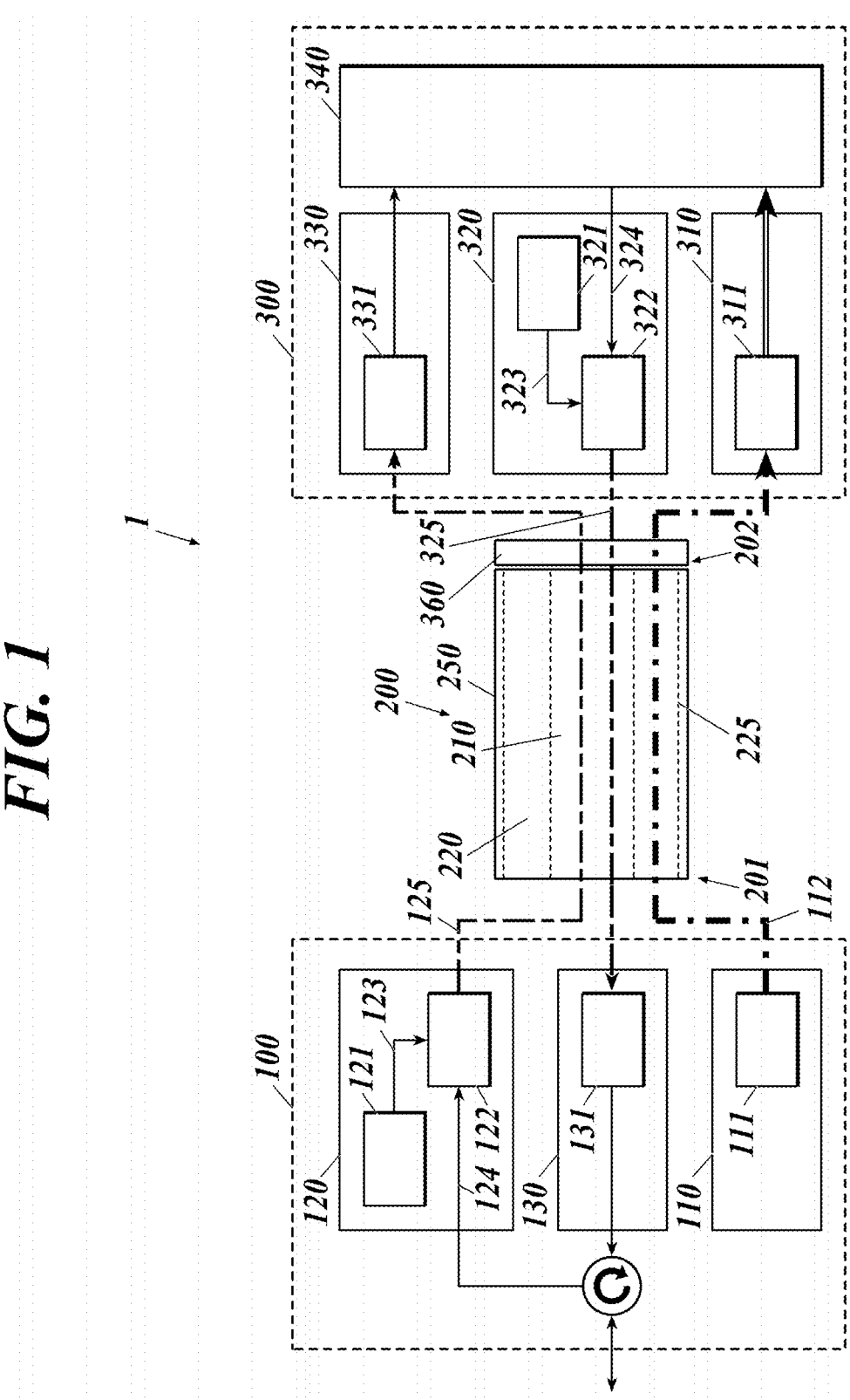
FIG. 1 is a block diagram of a power over fiber system of an embodiment(s).

Hereinafter, one or more embodiments of the present disclosure will be described in detail with reference to the drawings. FIG. 1 is a block diagram of a power over fiber system of an embodiment(s).

As shown in FIG. 1, a power over fiber (PoF) system 1 of this embodiment is an optical transmission system that performs power supply and optical communication through an optical fiber 250. The power over fiber system 1 includes: a first data communication device 100 including a power sourcing equipment (PSE) 110; an optical fiber cable 200; and a second data communication device 300 including a powered device (PD) 310. The power over fiber system 1 further includes a demultiplexer 360. The demultiplexer 360 may be included in the second data communication device 300.

The power sourcing equipment 110 includes a semiconductor laser 111 for power supply. The first data communication device 100 includes, in addition to the power sourcing equipment 110, a transmitter 120 and a receiver 130 for data communication. The first data communication device 100 corresponds to a data terminal equipment (DTE), a repeater or the like. The transmitter 120 includes a semiconductor laser 121 for signals and a modulator 122. The receiver 130 includes a photodiode 131 for signals.

The optical fiber cable 200 includes the optical fiber 250. The optical fiber 250 includes: a core 210 that forms a transmission path of signal light; a cladding 220 (corresponding to a first cladding) that is arranged around the core 210 and forms a transmission path of feed light; and an outer cladding 225 (corresponding to a second cladding) that is arranged around the cladding 220.

The powered device 310 includes a photoelectric conversion element 311. The second data communication device 300 includes, in addition to the powered device 310, a transmitter 320, a receiver 330 and a data processing unit 340. The second data communication device 300 corresponds to a power end station or the like. The transmitter 320 includes a semiconductor laser 321 for signals and a modulator 322. The receiver 330 includes a photodiode 331 for signals. The data processing unit 340 processes received signals. The second data communication device 300 is a node in a communication network. The second data communication device 300 may be a node that communicates with another node.

The first data communication device 100 is connected to a power source, and electrically drives the semiconductor laser 111, the semiconductor laser 121, the modulator 122, the photodiode 131 and so forth. The first data communication device 100 is a node in a communication network.

The first data communication device 100 may be a node that communicates with another node.

The semiconductor laser 111 oscillates with the electric power from the power source, thereby outputting feed light 112.

The photoelectric conversion element 311 converts the feed light 112 transmitted through the optical fiber cable 200 into electric power. The electric power obtained by the conversion of the feed light 112 by the photoelectric conversion element 311 is driving power needed in the second data communication device 300, for example, driving power for the transmitter 320, the receiver 330 and the data processing unit 340. The second data communication device 300 may be capable of outputting, for an external device(s), the electric power obtained by the conversion of the feed light 112 by the photoelectric conversion element 311.

Semiconductor materials of semiconductor regions of the semiconductor laser 111 and the photoelectric conversion element 311 are semiconductors having a laser wavelength being a short wavelength of 500 nm or less. The semiconductor regions exhibit light-electricity conversion effect. Semiconductors having a laser wavelength being a short wavelength have a large band gap and a high photoelectric conversion efficiency, and hence improve photoelectric conversion efficiency at the power supplying side and the power receiving side in optical power supply, and improve optical power supply efficiency.

Hence, as the semiconductor materials, laser media having a laser wavelength (base wave) of 200 nm to 500 nm may be used. Examples thereof include diamond, gallium oxide, aluminum nitride and gallium nitride. Further, as the semiconductor materials, semiconductors having a band gap of 2.4 eV or greater are used. For example, laser media having a band gap of 2.4 eV to 6.2 eV may be used. Examples thereof include diamond, gallium oxide, aluminum nitride and gallium nitride.

Laser light having a longer wavelength tends to have a higher transmission efficiency, whereas laser light having a shorter wavelength tends to have a higher photoelectric conversion efficiency. Hence, when laser light is transmitted for a long distance, laser media having a laser wavelength (base wave) of greater than 500 nm may be used as the semiconductor materials, whereas when the photoelectric conversion efficiency is given priority, laser media having a laser wavelength (base wave) of less than 200 nm may be used as the semiconductor materials.

Any of these semiconductor materials may be used in one of the semiconductor laser 111 and the photoelectric conversion element 311. This improves the photoelectric conversion efficiency at either the power supplying side or the power receiving side, and improves the optical power supply efficiency.

The modulator 122 of the transmitter 120 modulates laser light 123 output by the semiconductor laser 121 to signal light 125 on the basis of transmission data 124, and outputs the signal light 125.

The photodiode 331 of the receiver 330 demodulates the signal light 125 transmitted through the optical fiber cable 200 to an electric signal, and outputs the electric signal to the data processing unit 340. The data processing unit 340 transmits data of the electric signal to a node, and also receives data from the node and outputs the data to the modulator 322 as transmission data 324.

The modulator 322 of the transmitter 320 modulates laser light 323 output by the semiconductor laser 321 to signal light 325 on the basis of the transmission data 324, and outputs the signal light 325.

The photodiode 131 of the receiver 130 demodulates the signal light 325 transmitted through the optical fiber cable 200 to an electric signal, and outputs the electric signal. Data of the electric signal is transmitted to a node, whereas data from the node is the transmission data 124.

The feed light 112 and the signal light 125 from the first data communication device 100 are input to one end 201 of the optical fiber cable 200, propagate through the cladding 220 and the core 210, respectively, and are output from the other end 202 of the optical fiber cable 200 to the second data communication device 300.

The signal light 325 from the second data communication device 300 is input to the other end 202 of the optical fiber cable 200, propagates through the core 210, and is output from the one end 201 of the optical fiber cable 200 to the first data communication device 100.

<Demultiplexer>

Figure 2:
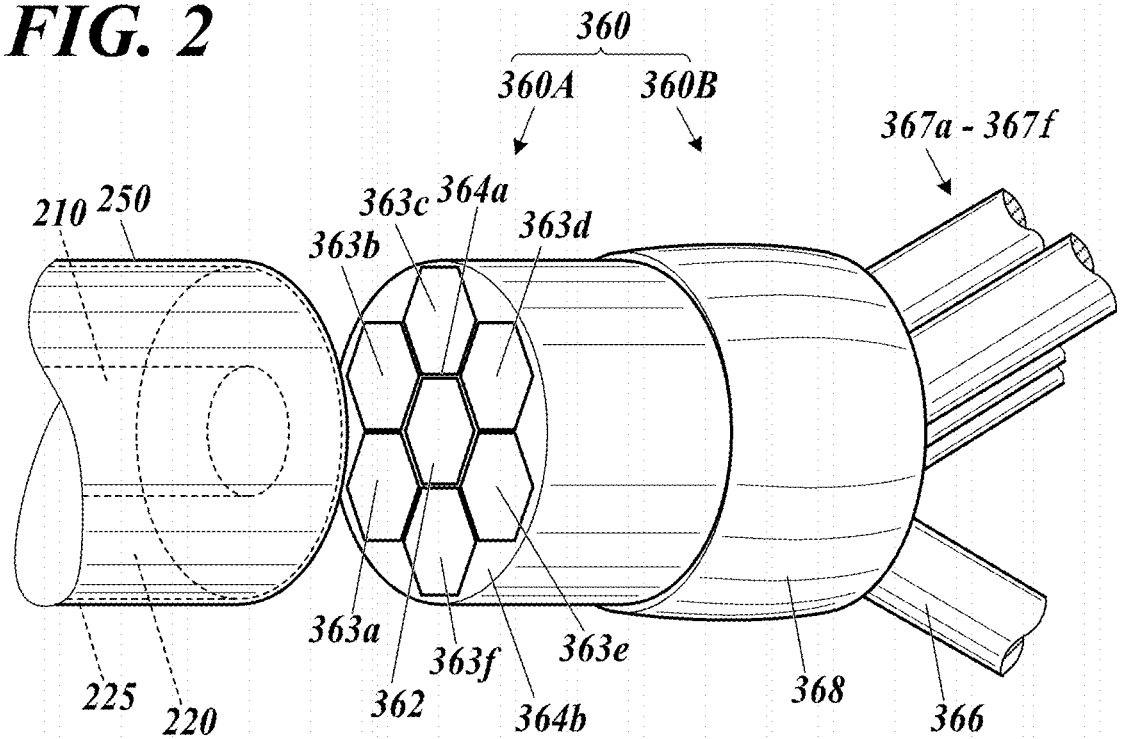
FIG. 2 is a perspective view of a demultiplexer shown in FIG. 1.
Figure 3:
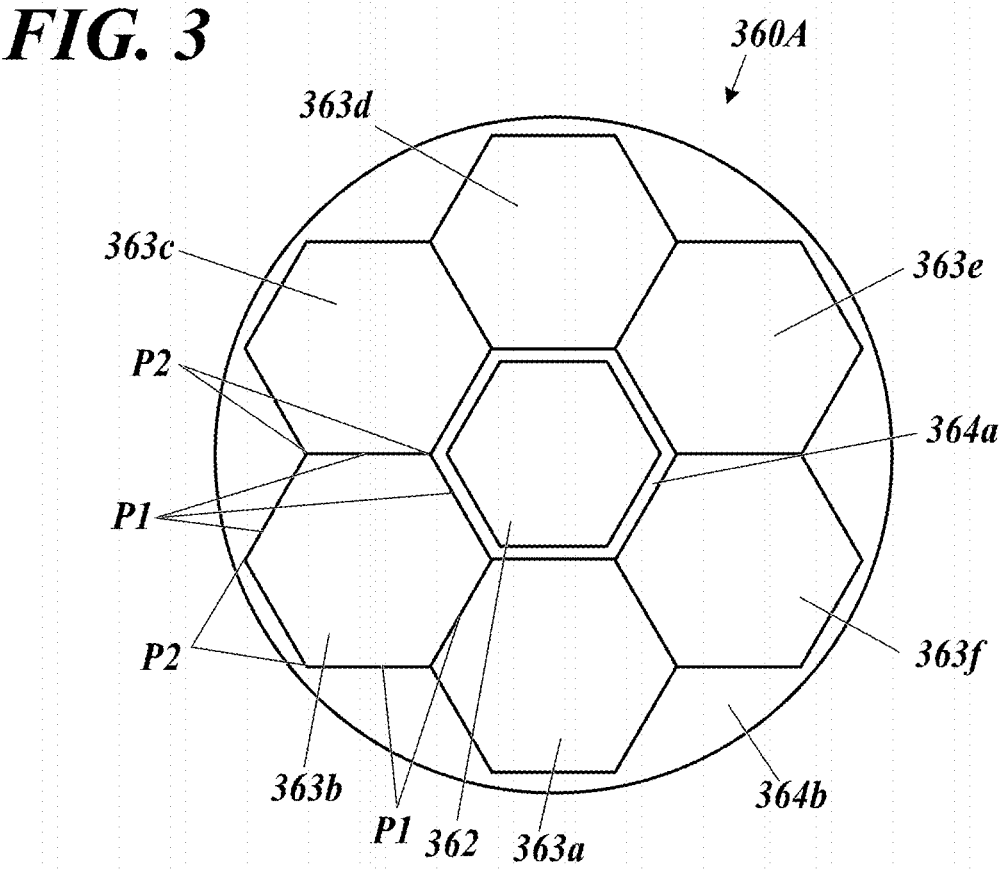
FIG. 3 is a front view of a fiber array shown in FIG. 2.
Figure 4:
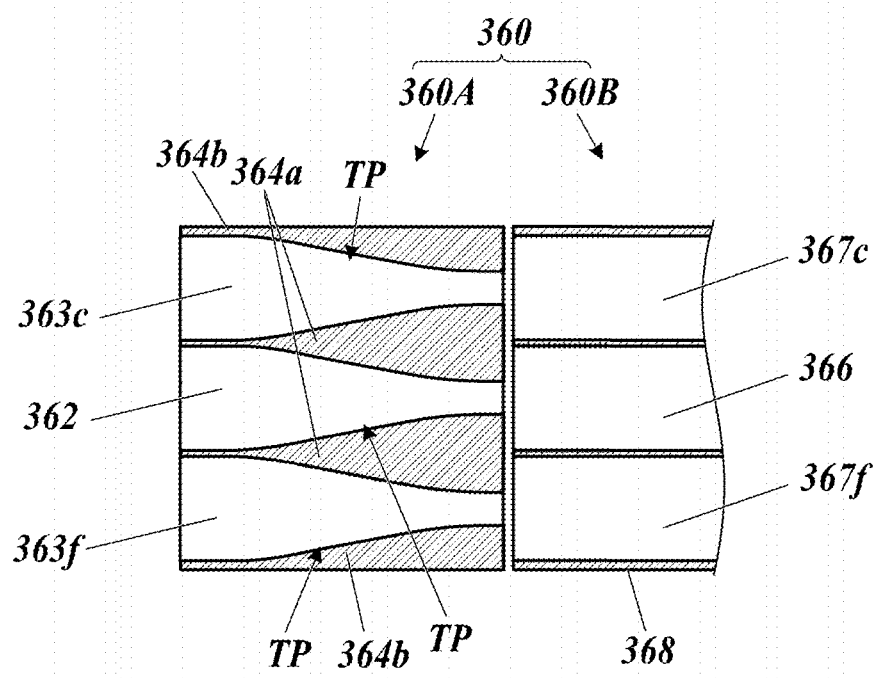
FIG. 4 is an illustration to explain configuration of the fiber array shown in FIG. 2.

FIG. 2 is a perspective view of the demultiplexer shown in FIG. 1. FIG. 3 is a front view of an optical fiber component shown in FIG. 2. FIG. 4 is an illustration to explain configuration of the optical fiber component shown in FIG. 2.

As shown in FIG. 2, the demultiplexer 360 includes an optical fiber component 360A and an optical fiber array 360B.

The optical fiber component 360A is configured such that optical fibers 362, 363a-363f adhere to one another with (via) filler 364a and coating 364b, such as curable resin composites. The optical fibers 362, 363a-363f are each a strand having a core and a cladding, for example. The optical fiber 362 (corresponding to a first optical fiber) is centered at the input end. The other optical fibers 363a-363f (corresponding to second optical fibers) are disposed around (i.e., so as to surround) the central optical fiber 362. The central optical fiber 362 has a core diameter (core width) that allows the wavelength of the signal light to pass through. The surrounding optical fibers 363a-363f each have a core diameter (core width) that allows the wavelength of the feed light to pass through.

The central optical fiber 362 has a cross-sectional area corresponding to the core 210 of the optical fiber 250, and is disposed at a position corresponding to the core 210 of the optical fiber 250. The position corresponding to the core 210 means a position that faces the output end face of the core 210 and to which the signal light 125 is input from the core 210.

The surrounding optical fibers 363a-363f lie annularly at the input end, and are disposed at positions corresponding to the cladding 220 of the optical fiber 250. The positions corresponding to the cladding 220 mean positions that face the output end face of the cladding 220 and to which the feed light 112 is input from the cladding 220. At the input end, the width from the inner peripheral end to the outer peripheral end of the surrounding optical fibers 363a-363f viewed as an annular assembly may be equal to or larger than the width from the inner peripheral end to the outer peripheral end of the cladding 220.

The input end face of each of the surrounding optical fibers 363a-363f is, for example, in the shape of a polygon, such as a regular hexagon, having straight portions P1 and corner portions P2 (shown in FIG. 3). At the input end, the straight portions P1 of each two adjacent optical fibers of the surrounding optical fibers 363a-363f may be in contact with one another, and also the corner portions P2 thereof may be in contact with one another. The input end face of each of the optical fibers 363a-363f may be in the shape of being surrounded by a straight portion(s), corner portions and a curved portion(s).

The input end face of the central optical fiber 362 is, for example, in the shape of a polygon, such as a regular hexagon, but may be circular. At the input end shown in FIG. 2 to FIG. 4, between the central optical fiber 362 and the surrounding optical fibers 363a-363f, the filler 364a is interposed. However, at the input end, the central optical fiber 362 and the surrounding optical fibers 363a-363f may be in contact with one another with no gap.

As shown in FIG. 4, the optical fibers 362, 363a-363f each have a tapered portion TP the cross-sectional area of which decreases from a side close to the input end toward a side far from the input end. At the output end of the optical fiber component 360A, the optical fibers 362, 363a-363f are separate from one another. The output end face of each of the optical fibers 362, 363a-363f may be circular. Only the surrounding optical fibers 363a-363f may have the tapered portions TP described above.

As shown in FIG. 2 and FIG. 4, the optical fiber array 360B includes an optical fiber 366 through which the signal light 125 propagates, a plurality of optical fibers 367a-367f through which the feed light 112 propagates, and a holder 368 that holds one end of the optical fibers 366, 367a-367f. In FIG. 4, of the optical fibers 367a-367f, only the optical fibers 367c, 367f are shown, but the optical fibers 367a-367f are disposed at positions corresponding to the optical fibers 363a-363f.

The optical fibers 366, 367a-367f are each an optical fiber that includes a core and a cladding and the section of which is circular. The optical fiber 366 has a core diameter that allows the signal light 125 to propagate through. The optical fibers 367a-367f each have a core diameter that allows the feed light 112 to propagate through.

The holder 368 holds the optical fibers 366, 367a-367f at the input end. By being held by the holder 368, one optical fiber, 366, is centered, and the other optical fibers, 367a-367f, are disposed around the optical fiber 366, at the input end. In a state in which the optical fiber array 360B and the optical fiber component 360A are combined, the input end faces of the optical fibers 366, 367a-367f face the output end faces of the optical fibers 362, 363a-363f of the optical fiber component 360A, respectively.

The output end of the optical fibers 366, 367a-367f is free from the holder 368. The optical fiber 366, which is centered at the input end, has its output end in front of the photodiode 331. The optical fibers 367a-367f, which are disposed around the optical fiber 366 at the input end, have their output ends in front of the photoelectric conversion element 311.

<Actions and Effects of Demultiplexer>

The feed light 112 and the signal light 125 input from the first data communication device 100 have wavelengths different from one another and propagate through the cladding 220 and the core 210 of the optical fiber 250, respectively. The signal light 125 output from the core 210 of the optical fiber 250 at the other end 202 propagates through the central optical fiber 362 of the optical fiber component 360A and the central optical fiber 366 of the optical fiber array 360B to be transmitted to the photodiode 331. The feed light 112 output from the cladding 220 is transmitted to the surrounding optical fibers 363a-363f of the optical fiber component 360A.

At the input end of the optical fiber component 360A, of the optical fibers 363a-363f to which the feed light 112 is input, the straight portions P1 of each two optical fibers adjacent in the circumferential direction are in contact with one another, so that the amount of gaps between the optical fibers 363a-363f is small. Further, at the abovementioned input end, the width from the inner peripheral end to the outer peripheral end of the optical fibers 363a-363f, to which the feed light 112 is input, viewed as an annular assembly is sufficiently large. Hence, the feed light 112 output from the cladding 220 of the optical fiber 250 is transmitted to the optical fibers 363a-363f of the optical fiber component 360A with little leakage.

Further, the feed light 112 propagating through the optical fibers 363a-363f is narrowed by the tapered portions TP of the optical fibers 363a-363f, and is transmitted to the optical fibers 367a-367f of the optical fiber array 360B with little leakage. Then, the feed light 112 propagates through the optical fibers 367a-367f, and is transmitted to the photoelectric conversion element 311. Hence, the feed light 112 not reaching the photoelectric conversion element 311 accounts for a small proportion of the feed light 112 output from the cladding 220. Thus, highly efficient demultiplexing is achieved.

The signal light 325 output from the second data communication device 300 is input to the optical fiber 366, which is held at the center of the optical fiber array 360B, via a not-shown multiplexer. Then, the signal light 325 is transmitted to the core 210 of the optical fiber 250 via the central optical fiber 362 of the optical fiber component 360A.

As described above, according to the optical fiber component 360A of this embodiment, the optical fiber component 360A includes the optical fiber 362 disposed at the center and the optical fibers 363a-363f disposed around the optical fiber 362. Further, each of the optical fibers 363a-363f has, at one end (e.g., input end), an end face shape having the straight portions P1 and the corner portions P2. These end faces of the optical fibers 363a-363f lying annularly can reduce the amount of gaps therebetween as compared with a case where the end faces are circular. Thus, one end of the optical fiber component 360A facing the cladding 220 of the optical fiber 250 allows laser light output from the cladding 220 to be taken into the optical fibers 363a-363f with little loss.

Further, according to the optical fiber component 360A of this embodiment, at one end (e.g., input end), the straight portions P1 of each two adjacent optical fibers of the surrounding optical fibers 363a-363f are in contact with one another. This configuration can further reduce the amount of gaps between the optical fibers 363a-363f, and allows laser light output from the cladding 220 to be taken into the optical fibers 363a-363f with less loss.

Further, according to the optical fiber component 360A of this embodiment, each of the surrounding optical fibers 363a-363f has the tapered portion TP, the cross-sectional area of which decreases from one end (input end) toward the other end (output end). This makes it possible to, at the other end, separate the optical fibers 363a-363f from one another and transmit the feed light 112 to the optical fiber array 360B with little loss.

According to the demultiplexer 360 of this embodiment, thanks to the above-described actions of the optical fiber component 360A, the demultiplexer 360 can demultiplex laser light of a plurality of wavelengths transmitted through the optical fiber 250, which is a double-clad fiber, with a high efficiency.

According to the power over fiber system 1 of this embodiment, the power over fiver system 1 including the demultiplexer 360, which provides the above-described effects, can achieve highly efficient transmission of the signal light 125 and the feed light 112.

Although one or more embodiments of the present disclosure have been described above, the present invention is not limited to the above embodiments. For example, in the above embodiment(s), the optical fiber component is configured such that the optical fibers are bundled together from one end to the other end. However, the optical fiber component may be configured such that the optical fibers are bundled together at one end and not bundled together at the other end. For example, the optical fiber component 360A and the optical fiber array 360B may be integrated. Further, in the above embodiment(s), the surrounding optical fibers 363a-363f of the optical fiber component 360A lie annularly in the circumferential direction. However, optical fibers surrounding the central one may lie not only annularly in the circumferential direction but also at multiple stages in the radial direction. In this case, of the surrounding optical fibers, the straight portions of each two adjacent optical fibers in the radial direction may also be in contact with one another. This configuration can further reduce the amount of gaps between the surrounding optical fibers.

Further, in the above embodiment(s), the straight portions P1 of the surrounding optical fibers 363a-363f of the optical fiber component 360A are in contact with one another at one end (input end). However, the straight portions P1 thereof may not be in contact with one another as far as they are close to one another. This can reduce the amount of gaps between the optical fibers as compared with the case where optical fibers each having a circular end face are ranged.

Further, in the above embodiment(s), the optical fibers of the optical fiber component have the tapered portions TP. However, if the optical fibers are free at the other end, the tapered portions TP may be omitted. Even when the optical fibers are bundled together at the other end, the tapered portions TP may be omitted by adopting a structure in which at the other end, the optical fibers are fixed with spaces therebetween widened. The details described in the embodiment(s) can be appropriately modified within a range not departing from the scope of the invention.

INDUSTRIAL APPLICABILITY

The present disclosure is applicable to an optical fiber component, a demultiplexer and an optical transmission system.

REFERENCE SIGNS LIST

1 Power over Fiber System (Optical Transmission System)
100 First Data Communication Device
110 Power Sourcing Equipment
111 Semiconductor Laser for Power Supply
112 Feed Light
120 Transmitter
121 Semiconductor Laser for Signals
122 Modulator
123 Laser Light
124 Transmission Data
125 Signal Light
130 Receiver
131 Photodiode for Signals
200 Optical Fiber Cable
201 One End of Optical Fiber Cable
202 Other End of Optical Fiber Cable
210 Core
220 Cladding (First Cladding)
225 Outer Cladding (Second Cladding)
250 Optical Fiber
300 Second Data Communication Device
310 Powered Device
311 Photoelectric Conversion Element
320 Transmitter
321 Semiconductor Laser for Signals
322 Modulator
323 Laser Light
324 Transmission Data
325 Signal Light
330 Receiver
331 Photodiode for Signals
340 Data Processing Unit
360 Demultiplexer
360A Optical Fiber Component
360B Optical Fiber Array
362 Optical Fiber (First Optical Fiber)
363a to 363f Optical Fiber (Second Optical Fiber)
TP Tapered Portion
366, 367a to 367f Optical Fiber
368 Holder
P1 Straight Portion
P2 Corner Portion

The invention claimed is:

1. A demultiplexer, comprising:
an optical fiber component; and
an optical fiber array, wherein
the optical fiber component comprises:
  a plurality of optical fibers bundled together at one end at least, the plurality of optical fibers including:
    a first optical fiber centered at the one end, and
    a plurality of second optical fibers disposed around the first optical fiber at the one end, wherein each of the plurality of second optical fibers has, at the one end, an output end face having a shape including a straight portion and a corner portion, and
  a filler between the first optical fiber and the plurality of second optical fibers,
each of the plurality of second optical fibers includes a tapered portion having a cross-sectional area which tapers in a direction from the one end to another end,
a gap between the first optical fiber and each of the plurality of second optical fibers at the tapered portion is increased from the one end toward the another end,
an amount of the filler at the tapered portions of the plurality of second optical fibers increases from the one end toward the another end, and
the optical fiber array comprises:
  a third optical fiber having an input end face with a shape different from that of a further output end face of the first optical fiber at the another end,
  a plurality of fourth optical fibers, and
  a holder configured to hold
    (i) the input end face of the third optical fiber to face the further output end face of the first optical fiber, and
    (ii) a further input end face of each of the plurality of fourth optical fibers to face the output end face of a corresponding second optical fiber of the plurality of second optical fibers at the another end.

2. The demultiplexer according to claim 1, wherein the straight portion of a second optical fiber and the straight portion of another second optical fiber that are two adjacent second optical fibers of the plurality of second optical fibers are in contact with one another.

3. The demultiplexer according to claim 2, wherein
in each of the plurality of second optical fibers, the tapered portion has the cross-sectional area smaller at a side close to the another end than that at a side close to the one end.

4. The demultiplexer according to claim 3,
wherein the demultiplexer is configured to demultiplex light of a plurality of wavelengths output from an optical fiber including a core, a first cladding located around the core, and a second cladding located around the first cladding, and
wherein the one end of the optical fiber component faces an output end face of the optical fiber.

5. An optical transmission system, comprising:
the demultiplexer according to claim 4,
wherein the optical transmission system is configured to transmit signal light and feed light through the optical fiber, and
wherein the demultiplexer faces the output end face of the optical fiber.

6. The demultiplexer according to claim 2,
wherein the demultiplexer is configured to demultiplex light of a plurality of wavelengths output from an optical fiber including a core, a first cladding located around the core, and a second cladding located around the first cladding, and
wherein the one end of the optical fiber component faces an output end face of the optical fiber.

7. An optical transmission system, comprising:
the demultiplexer according to claim 6,
wherein the optical transmission system is configured to transmit signal light and feed light through the optical fiber, and
wherein the demultiplexer faces the output end face of the optical fiber.

8. The demultiplexer according to claim 1, wherein
in each of the plurality of second optical fibers, the tapered portion has the cross-sectional area smaller at a side close to the another end than that at a side close to the one end.

9. The demultiplexet according to claim 8;
wherein the demultiplexer is configured to demultiplex light of a plurality of wavelengths output from an optical fiber including a core, a first cladding located around the core, and a second cladding located around the first cladding, and
wherein the one end of the optical fiber component faces an output end face of the optical fiber.

10. An optical transmission system, comprising:
the demultiplexer according to claim 9,
wherein the optical transmission system is configured to transmit signal light and feed light through the optical fiber, and
wherein the demultiplexer faces the output end face of the optical fiber.

11. The demultiplexer according to claim 1,
wherein the demultiplexer is configured to demultiplex light of a plurality of wavelengths output from an optical fiber including a core, a first cladding located around the core, and a second cladding located around the first cladding, and
wherein the one end of the optical fiber component faces an output end face of the optical fiber.

12. An optical transmission system, comprising:
the demultiplexer according to claim 11,
wherein the optical transmission system is configured to transmit signal light and feed light through the optical fiber, and
wherein the demultiplexer faces the output end face of the optical fiber.

13. The demultiplexer according to claim 1, further comprising:
a coating at an outer side of the plurality of second optical fibers, wherein
a thickness of the coating at the tapered portions of the plurality of second optical fibers increases from the one end toward the another end.

14. The demultiplexer according to claim 1, wherein
the filler is at an inner side of the plurality of second optical fibers between the first optical fiber and the plurality of second optical fibers, and
the first optical fiber includes a further tapered portion having a cross-sectional area which tapers in the direction from the one end to the another end.

15. The demultiplexer according to claim 14, further comprising:
a coating at an outer side of the plurality of second optical fibers opposite to the inner side,
wherein a thickness of the coating at the tapered portions of the plurality of second optical fibers increases from the one end toward the another end.

16. The demultiplexer according to claim 1, wherein
the input end face of the third optical fiber has a circular shape, and the further output end face of the first optical fiber has a hexagon shape.

17. The demultiplexer according to claim 16, wherein
the input end face of the third optical fiber has a dimension different from that of the further output end face of the first optical fiber.

18. The demultiplexer according to claim 17, wherein
the further input end face of each of the plurality of fourth optical fibers has a shape different from that of the output end face of the corresponding second optical fiber of the plurality of second optical fibers.

19. The demultiplexer according to claim 18, wherein
the further input end face of each of the plurality of fourth optical fibers has a dimension different from that of the output end face of the corresponding second optical fiber of the plurality of second optical fibers.

* * * * *